US011989906B2

(12) United States Patent
Kim et al.

(10) Patent No.: US 11,989,906 B2
(45) Date of Patent: May 21, 2024

(54) OBJECT RECOGNITION SYSTEM, POSITION INFORMATION ACQUISITION METHOD, AND PROGRAM

(71) Applicant: RAKUTEN GROUP, INC., Tokyo (JP)

(72) Inventors: Mijung Kim, Tokyo (JP); Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 223 days.

(21) Appl. No.: 17/414,312

(22) PCT Filed: Jan. 29, 2020

(86) PCT No.: PCT/JP2020/003188
§ 371 (c)(1),
(2) Date: Jun. 15, 2021

(87) PCT Pub. No.: WO2021/152727
PCT Pub. Date: Aug. 5, 2021

(65) Prior Publication Data
US 2022/0319033 A1    Oct. 6, 2022

(51) Int. Cl.
*G06K 9/00*    (2022.01)
*G06Q 20/18*    (2012.01)
*G06T 7/20*    (2017.01)
*G06T 7/70*    (2017.01)
*G06V 10/764*    (2022.01)

(52) U.S. Cl.
CPC .............. *G06T 7/70* (2017.01); *G06Q 20/18* (2013.01); *G06T 7/20* (2013.01); *G06V 10/764* (2022.01); *G06T 2207/10016* (2013.01); *G06T 2207/20081* (2013.01)

(58) Field of Classification Search
CPC ....................................... G06Q 20/18
See application file for complete search history.

(56) References Cited

U.S. PATENT DOCUMENTS

| | | | | |
|---|---|---|---|---|
| 10,282,720 | B1* | 5/2019 | Buibas | G06Q 20/40 |
| 10,282,852 | B1* | 5/2019 | Buibas | G06T 7/246 |
| 2011/0109759 | A1 | 5/2011 | Abe | |
| 2018/0342078 | A1* | 11/2018 | Watanabe | G06V 10/255 |
| 2019/0347486 | A1* | 11/2019 | Yun | G06T 7/70 |
| 2020/0020112 | A1* | 1/2020 | Buibas | G07G 1/0063 |

FOREIGN PATENT DOCUMENTS

| | | |
|---|---|---|
| JP | 2011040993 A | 2/2011 |
| JP | 2017033175 A | 2/2017 |
| JP | 2019101535 A | 6/2019 |
| JP | 2020008896 A | 1/2020 |

* cited by examiner

*Primary Examiner* — Hadi Akhavannik
(74) *Attorney, Agent, or Firm* — HEA LAW PLLC

(57) ABSTRACT

An object recognition system, comprising at least one processor configured to: input an input image to a learning model for recognizing a first object acquire first information about a position that is a basis for recognition by the learning model having the input image input thereto; acquire second information about a position of a moving body, or a foreground, that is included in the input image; and acquire position information about a position of the first object included in the input image, based on the first information and the second information.

17 Claims, 10 Drawing Sheets

FIG.5

| INPUT | OUTPUT | |
|---|---|---|
| | CLASSIFICATION INFORMATION | POSITION INFORMATION |
| FIRST FRAME OF v00001.mpg | SNACK XXX | (Xa1,Ya1),(Xb1,Yb1),(Xc1,Yc1),(Xd1,Yd1) |
| SECOND FRAME OF v00001.mpg | SNACK XXX | (Xa2,Ya2),(Xb2,Yb2),(Xc2,Yc2),(Xd2,Yd2) |
| THIRD FRAME OF v00001.mpg | SNACK XXX | (Xa3,Ya3),(Xb3,Yb3),(Xc3,Yc3),(Xd3,Yd3) |
| ⋮ | ⋮ | ⋮ |

| USER ID | ITEM ID | ITEM NAME | QUANTITY | UNIT PRICE |
|---|---|---|---|---|
| u00001 | i00001 | SNACK XXX | 1 | 150 YEN |
| | i00002 | SANDWICH Y | 1 | 250 YEN |

| USER ID | NAME | PASSWORD | FACE IMAGE | FACE FEATURE AMOUNT | PAYMENT INFORMATION |
|---------|------|----------|------------|---------------------|---------------------|
| u00001 | AAA | ******* | aaa.jpg | (a1,b1,c1,d1,···) | 1111-2222-3333-4444 |
| u00002 | BBB | ***** | bbb.jpg | (a2,b2,c2,d2,···) | 9999-8888-7777-6666 |
| u00003 | CCC | ******** | ccc.jpg | (a3,b3,c3,d3,···) | 0000-5555-2222-8888 |
| ⋮ | ⋮ | ⋮ | ⋮ | ⋮ | ⋮ |

DB

OBJECT RECOGNITION SYSTEM, POSITION INFORMATION ACQUISITION METHOD, AND PROGRAM

CROSS REFERENCE TO RELATED APPLICATIONS

This application is a National Stage of International Application No. PCT/JP2020/003188 filed on Jan. 29, 2020. The contents of the above document is incorporated herein by reference in its entirety.

TECHNICAL FIELD

The present disclosure relates to an object recognition system, a position information acquisition method, and a program.

BACKGROUND ART

Hitherto, technologies of recognizing an object included in an image have been known. For example, in Patent Literature 1, there is described a technology with which a range specified by a user in a first frame of a moving image is used as a template image in execution of template matching, and an object within the range is recognized and tracked in the subsequent frames. To give another example, in Patent Literature 2, there is described a technology of recognizing and tracking an object based on a learning model that is learned with teaching data classifying a range that is a tracking target as a positive example and a range that is not a tracking target as a negative example.

CITATION LIST

Patent Literature

[PTL 1] JP 2011-40993 A
[PTL 2] JP 2017-33175 A

SUMMARY OF INVENTION

Technical Problem

With the related art, however, a user is required to specify a range that is a target of recognition, which is a burden on the user. The burden is particularly heavy when, for example, objects of a plurality of types are to be recognized and the user is required to specify as many ranges as the number of the types.

An object of the present disclosure is to lighten a burden on a user in object recognition.

Solution to Problem

According to one embodiment of the present disclosure, there is provided an object recognition system including: input means for inputting an input image to a learning model for recognizing an object; first acquisition means for acquiring first information about a position that is a basis for recognition by the learning model having the input image input thereto; second acquisition means for acquiring second information about a position of a moving body, or a foreground, that is included in the input image; and position information acquisition means for acquiring position information about a position of the object included in the input image, based on the first information and the second information.

According to one embodiment of the present disclosure, there is provided a position information acquisition method including: an input step of inputting an input image to a learning model for recognizing an object; a first acquisition step of acquiring first information about a position that is a basis for recognition by the learning model having the input image input thereto; a second acquisition step of acquiring second information about a position of a moving body, or a foreground, that is included in the input image; and a position information acquisition step of acquiring position information about a position of the object included in the input image, based on the first information and the second information.

According to one embodiment of the present disclosure, there is provided a program for causing a computer to function as: input means for inputting an input image to a learning model for recognizing an object; first acquisition means for acquiring first information about a position that is a basis for recognition by the learning model having the input image input thereto; second acquisition means for acquiring second information about a position of a moving body, or a foreground, that is included in the input image; and position information acquisition means for acquiring position information about a position of the object included in the input image, based on the first information and the second information.

According to one aspect of the present disclosure, the first information is information by which a value indicating a strength as a basis for recognition by the learning model is identifiable for each pixel of the input image, and the second information is information by which a value indicating a strength as the moving body or the foreground is identifiable for each pixel of the input image.

According to one aspect of the present disclosure, the position information acquisition means is configured to acquire the position information based on a result of adding together, with a use of a predetermined mathematical expression, a value identified from the first information as a value that is associated with a pixel or pixels in the input image and a value identified from the second information as a value that is associated with a pixel or pixels in the input image.

According to one aspect of the present disclosure, the object recognition system further includes third acquisition means for acquiring third information about a position of another object, which is included in the input image and which grasps the object, and the position information acquisition means is configured to acquire the position information based further on the third information.

According to one aspect of the present disclosure, the first information is information by which a value indicating a strength as a basis for recognition by the learning model is identifiable for each pixel of the input image, the second information is information by which a value indicating a strength as the moving body or the foreground is identifiable for each pixel of the input image, and the third information is information by which a value indicating a strength as the position of the another object is identifiable for each pixel of the input image.

According to one aspect of the present disclosure, the position information acquisition means is configured to acquire the position information based on a result of adding together, with a use of a predetermined mathematical expression, a value identified from the first information as a value that is associated with a pixel or pixels in the input image and a value identified from the second information as a value that is associated with a pixel or pixels in the input image, and subtracting, with a use of a predetermined mathematical expression, a value identified from the third information as a value that is associated with a pixel or pixels in the input image.

According to one aspect of the present disclosure, the position information acquisition means is configured to acquire the position information based further on weighting that is based on the first information.

According to one aspect of the present disclosure, the position information indicates an area including the object, and the position information acquisition means is configured to acquire a plurality of candidates for the area, and acquire the position information based on one of the plurality of candidates that is largest in size.

According to one aspect of the present disclosure, the input image includes a plurality of types of objects each of which is the object, and the position information acquisition means is configured to acquire the position information for each object type out of the plurality of types of objects included in the input image.

According to one aspect of the present disclosure, the object recognition system further includes learning means for executing, based on teaching data that is generated based on the input image and the position information, learning processing of another learning model for recognizing a position of the object.

According to one aspect of the present disclosure, the input image is a frame in a moving image, the position information acquisition means is configured to acquire the position information for each frame in the moving image, and the learning means is configured to execute the learning processing based on a teaching data set including a plurality of pieces of the teaching data that are generated from the moving image.

According to one aspect of the present disclosure, the input image is a frame in a moving image, and the object recognition system further includes tracking means for tracking the object included in the moving image, based on the position information.

According to one aspect of the present disclosure, the learning model is a classifier configured to classify a type of the object, or a determiner configured to determine whether the object is present.

According to one aspect of the present disclosure, the position information is information about a bounding box including the object.

According to the present disclosure, it is possible to lighten the burden on the user in the object recognition.

BRIEF DESCRIPTION OF DRAWINGS

FIG. 5 is a table for showing a data storage example of a teaching data set.

FIG. 6 is a table for showing a data storage example of shopping cart data.

FIG. 7 is a table for showing a data storage example of a user database.

DESCRIPTION OF EMBODIMENTS

1. Overall Configuration of Object Recognition System

Figure 1:
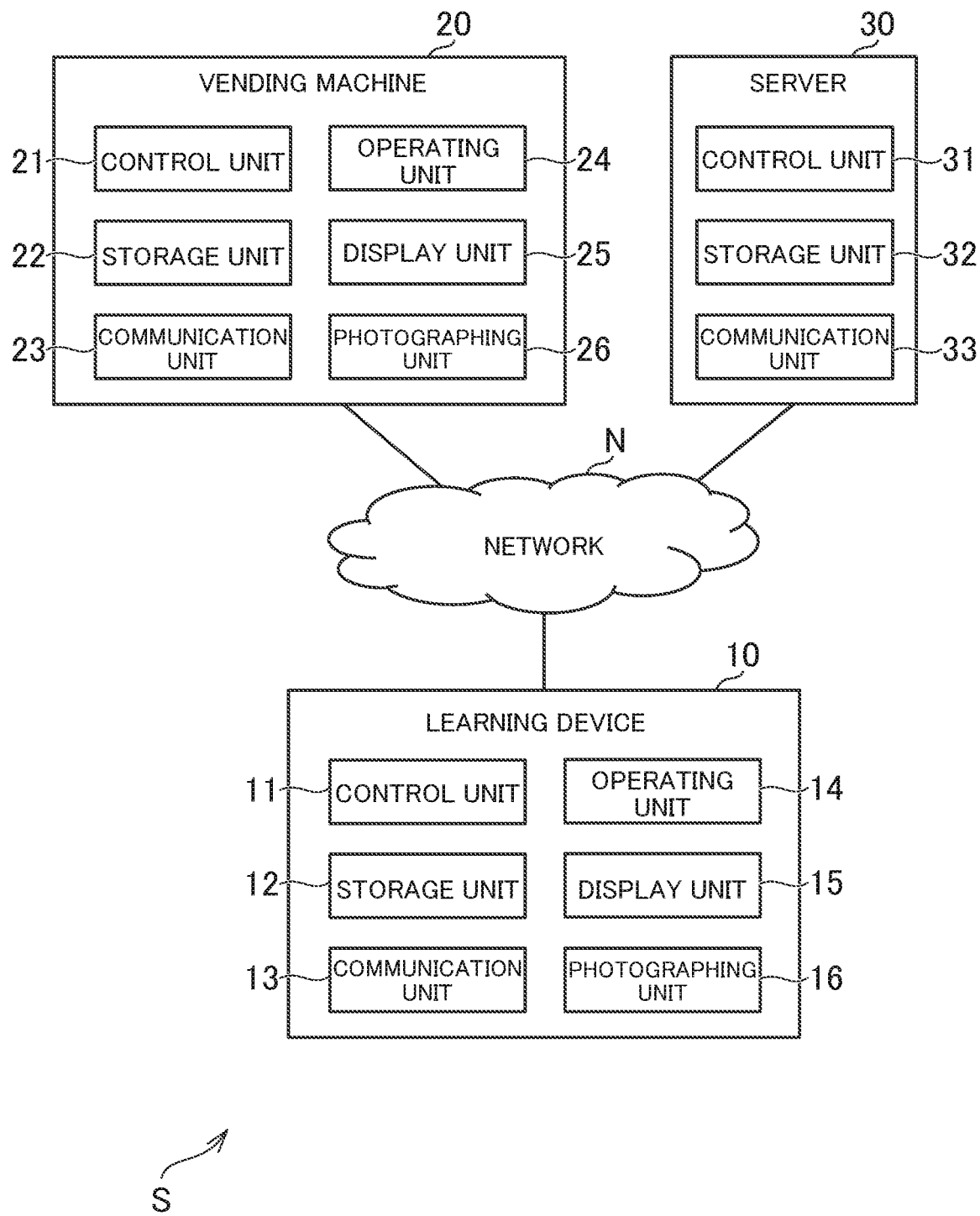
FIG. 1 is a diagram for illustrating an overall configuration of an object recognition system.

An example of an object recognition system according to an embodiment of the present disclosure is described below. FIG. 1 is a diagram for illustrating an overall configuration of the object recognition system. As illustrated in FIG. 1, an object recognition system S includes a learning device 10, a vending machine 20, and a server 30, and those are connectable to a network N, which is the Internet or the like. Although one learning device 10, one vending machine 20, and one server 30 are illustrated in FIG. 1, there may be a plurality of learning devices 10, a plurality of vending machines 20, and a plurality of servers 30.

The learning device 10 is a computer to be operated by an administrator. For example, the learning device 10 is a personal computer, a portable information terminal (including a tablet computer), or a cellular phone (including a smart phone). The learning device 10 includes a control unit 11, a storage unit 12, a communication unit 13, an operating unit 14, a display unit 15, and a photographing unit 16.

The control unit 11 includes at least one microprocessor. The control unit 11 executes processing as programmed by programs and data stored in the storage unit 12. The storage unit 12 includes a main memory unit and an auxiliary memory unit. The main memory unit is a volatile memory, for example, a RAM. The auxiliary memory unit is a non-volatile memory such as a ROM, an EEPROM, a flash memory, or a hard disk drive. The communication unit 13 is a communication interface for wired communication or wireless communication. The communication unit 13 performs data communication via the network N.

The operating unit 14 is an input device. The operating unit 14 is, for example, a pointing device such as a touch panel and a mouse, a keyboard, or a button. The operating unit 14 transmits details of operation by a user to the control unit 11. The display unit 15 is, for example, a liquid crystal display unit or an organic EL display unit. The display unit 15 displays a screen in accordance with an instruction of the control unit 11.

The photographing unit 16 includes at least one camera. For example, the photographing unit 16 generates an image based on a detection signal from a sensor CCD or an CMOS sensor. The photographing unit 16 may generate a still image or may generate a moving image at a predetermined frame rate. The photographing unit 16 may include a depth camera or an infrared camera.

The vending machine 20 is an apparatus configured to sell commercial products unattended. The vending machine 20 may be installed indoor or outdoor. The vending machine 20 may be stationary in a predetermined place, or may manually or autonomously be movable. The vending machine 20 includes, for example, a control unit 21, a storage unit 22, a communication unit 23, an operating unit 24, a display unit 25, and a photographing unit 26. Physical configurations of the control unit 21, the storage unit 22, the communication unit 23, the operating unit 24, the display unit 25, and the photographing unit 26 may be the same as the physical configurations of the control unit 11, the storage unit 12, the communication unit 13, the operating unit 14, the display unit 15, and the photographing unit 16, respectively.

The server 30 is a server computer. For example, the server 30 includes a control unit 31, a storage unit 32, and a communication unit 33. Physical configurations of the control unit 31, the storage unit 32, and the communication unit 33 may be the same as those of the control unit 11, the storage unit 12, and the communication unit 13, respectively.

Programs and data described as being stored into the storage units 12, 22, and 32 may be supplied thereto via the network N. Further, the respective hardware configurations of the learning device 10, the vending machine 20, and the server 30 are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied through intermediation of the reading unit or the input/output unit.

2. Outline of Object Recognition System

In this embodiment, description is given of processing executed by the object recognition system S, taking as an example a scene in which the vending machine 20 sells commercial products. The vending machine 20 may sell any commercial product, for example, foods, beverages, stationery products, commodities, or sundries. The vending machine 20 sells at least one type of commercial products. A commercial product has an appearance depending on the type of the commercial product. The appearance is a physical appearance of the commercial product and is at least one of, for example, shape, size, color, and pattern. A price based on the type of the commercial product is set to the commercial product.

Figure 2:
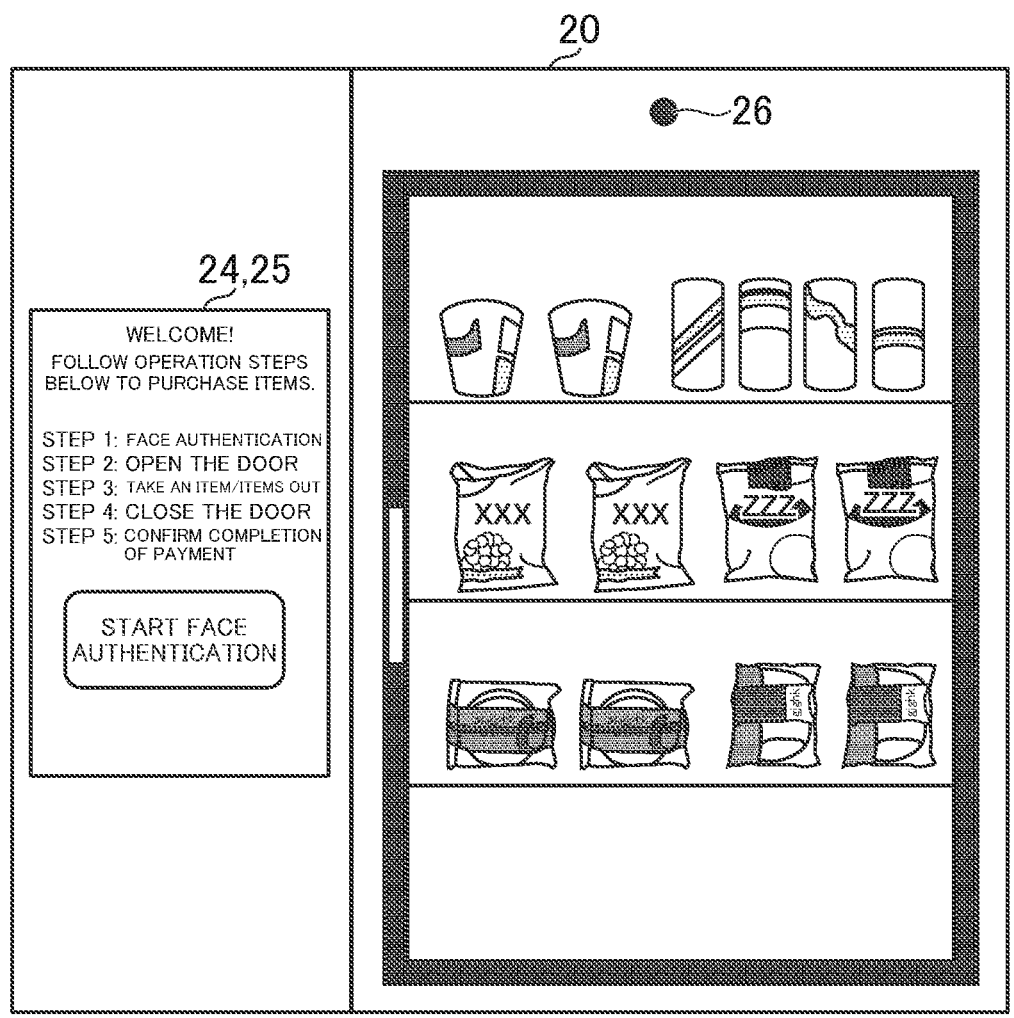
FIG. 2 is a diagram for illustrating an example of a vending machine.

FIG. 2 is a diagram for illustrating an example of the vending machine 20. As illustrated in FIG. 2, in this embodiment, a plurality of types of commercial products are on display in the vending machine 20. For example, the vending machine 20 has a door that enables a user to visually recognize the commercial products from the outside. The door on the vending machine 20 is locked by a known lock mechanism. The door is unlocked when the user stepping in front of the vending machine 20 is successfully authenticated.

The user is finished with user registration beforehand and information required for authentication is registered to the server 30 in advance. The description given in this embodiment takes face authentication as an example, but any type of authentication is employable. For example, other types of biometric authentication including fingerprint authentication, authentication using the user's terminal, authentication using an IC card, passcode authentication, or password authentication may be employed. To give another example, multi-step authentication combining a plurality of types of authentication may be employed.

As illustrated in FIG. 2, the photographing unit 26 is placed so as to flush with the front of the door. The photographing unit 26, which is placed above the door in the example of FIG. 2, may be placed in other places as long as the user's action of picking up an item can be photographed.

In this embodiment, the photographing unit 26 is stationary, meaning that the position and direction of the photographing unit 26 do not change. A background depicted in a photographed image that is generated by the photographing unit 26 therefore does not change as a rule. At least one of the position and direction of the photographing unit 26 may vary. The vending machine 20 may include a plurality of photographing units 26 so that different places are photographed with one photographing unit 26 and another photographing unit 26.

For example, the display unit 25 displays operation steps for purchasing an item. The user checks the operation steps displayed on the display unit 25, and operates the operating unit 24 to select a button. The photographing unit 26 generates photographed images by photographing in succession at a predetermined frame rate. Individual each of photographed images photographed in succession is hereinafter referred to as "frame". Each of individual still images included in a moving image is also a frame. The user steps in front of the photographing unit 26 to have the photographing unit 26 photograph his or her own face. The vending machine 20 transmits frames in succession to the server 30.

The server 30 receives the frames and executes face authentication of the user based on a known face authentication algorithm. The server 30 transmits an authentication result indicating whether the face authentication has succeeded to the vending machine 20. The vending machine 20 receives the authentication result and, when the authentication result indicates a failure, the vending machine 20 displays a predetermined error message on the display unit 25 without unlocking the door. In this case, face authentication may be executed again, or other types of authentication, for example, fingerprint authentication or password authentication, may be executed.

When the authentication result indicates a success, the vending machine 20 unlocks the door and displays a message to the effect that face authentication has succeeded on the display unit 25. With the door unlocked, the user can open the door and take an item out. The user can take any item out of an interior space of the vending machine 20 during a period starting with the opening of the door and ending with the closing of the door. The user is also allowed to return an item that has been taken out to the interior space.

For example, payment of the sale of a taken-out item is executed when the user closes the door, based on credit card information registered in advance. The vending machine 20 is accordingly required to identify, at the time of closing of the door, which item has been taken out. An item that has been taken out and then returned to the interior space of the vending machine 20 by the user is excluded from payment.

In this embodiment, the vending machine 20 identifies an item taken out by the user by analyzing frames of the photographing unit 26 with the use of a learning model stored in the storage unit 22. The vending machine 20 uses the learning model to perform image analysis on the frames during a period starting with the opening of the door by the user and ending with the closing of the door.

The learning model is a model in supervised machine learning. The phrase "learning model" itself may mean a learned model or a pre-learning model. For instance, a learning model M1 described later means a learned model. A learning model M2 described later means a pre-learning model prior to execution of learning processing by a learning unit 107 described later, and means a learned model after the execution of the learning processing. The learning model includes a program and a parameter, which is adjusted by the learning processing based on teaching data. Details of the teaching data are described later. The machine learning itself may be a method used in image recognition, for example, convolutional neural network (CNN), residual network (ResNet), or recurrent neural network (RNN).

The learning model in this embodiment is a recognizer configured to recognize an object included in an image. For example, the learning model is a classifier configured to classify the type of an object, or a determiner configured to determine whether there is an object.

The classifier is a model for classifying an object into one of a plurality of types. Classes can be reworded as "labels" and classifying an object may be expressed as "labeling". The classifier is only required to classify types of commercial products carried by the vending machine 20, and may be designed so as to classify more types than that. For example, the type of a commercial product is identified from the name, a model number, or code information (the JAN code or the EAN code, for example) of the commercial product.

The determiner is a model for determining whether there is an object of a predetermined type. The determiner may determine the presence or absence of only one type of object, or may determine whether there is an object of one of a plurality of types. However, the determiner that is capable of determination for a plurality of types of objects does not go as far as determining a type into which an object is classified, and only determines whether there is an object of one of the types. The determiner differs from the classifier in this regard.

A case in which the vending machine 20 uses a learning model that is the classifier is described in this embodiment. However, the vending machine 20 may use a learning model that is the determiner. In this case, one determiner is prepared for each of the types of commercial products carried by the vending machine 20. When the vending machine 20 sells only one type of commercial product, the learning model is the determiner.

The learning model is configured to recognize an object included in an input image. The input image is an image input to the learning model. In other words, the input image is an image to be processed (to be recognized) by the learning model. In the case of the learning model that is stored in the vending machine 20, each frame generated by the photographing unit 26 corresponds to the input image. The learning model calculates a feature amount of the input image, and recognizes an object included in the input image based on the feature amount.

The object is a photographed subject in the input image. The entirety of or a part of the object is photographed in the input image. In this embodiment, a commercial product corresponds to the object. "Commercial product/item" in the description of this embodiment can therefore be read as "object". The object can be anything recognizable by the learning model, and is not limited to commercial products. This is described later in a modification example.

"Recognition" is a concept including analysis, comprehension, classification, or identification of the input image. Detection of an object included in the input image, and specification of a position of the object in the input image are examples of recognition. The position of the object is the position of at least one pixel at which the object appears in the input image. The position of the object may be indicated by only one pixel (one pair of coordinates), or by an area including a plurality of pixels (a plurality of sets of coordinates). In this embodiment, the position of the object is indicated by a bounding box, which encloses the object and details of which are described later.

For example, the learning model of the vending machine 20 recognizes the type and position of a commercial product. The learning model recognizes not only the type of a commercial product but also the position thereof because the user may return the commercial product to the interior space of the vending machine 20. For instance, when the learning model recognizes an item in a frame and the item then moves downward beyond the frame and is no longer recognizable by the learning model, it is determined that the item has been returned. To give another example, when the learning model recognizes an item in a frame and the item then moves leftward, upward, or rightward beyond the frame and is no longer recognizable, it is determined that the item is not returned and is carried by the user (the item has simply moved out of the field of view).

A possible option in this case is to track the item by preparing a template image of the item and using template matching. However, the item is often partially hidden by the user's hand and cannot be tracked in some cases. A template image that depicts the item hidden by a hand is very laborious to prepare. Tracking of the item through tracking of the item's feature points extracted from a frame is not always successful because the feature points cannot be extracted depending on a speed at which the item is moved.

The vending machine 20 in this embodiment therefore recognizes an item by inputting each frame to the learning model. That is, the vending machine 20 executes recognition by the learning model for every frame.

Recognition by the learning model may be executed not for every frame but for every predetermined number of frames (for example, every three frames). The vending machine 20 may also use a part of an item recognized in one frame as a template image, and execute template matching in the subsequent frames to track the item. In this case, the direction of the item may change and the template image is therefore updated as required. Updating of the template image may be executed by inputting the latest frame to the learning model.

After the user takes the item out, the position and direction of the item relative to the photographing unit 26 are not always constant, and the learning model is accordingly required to learn the item photographed at various positions and in various directions. One way to accomplish this is to generate teaching data with the use of a moving image photographing the item that is being moved by the administrator in front of the vending machine 20.

However, manual specification of a range of the item in each individual frame (manual annotation on every frame) is a very heavy burden on the administrator. In this embodiment, the burden on the administrator is lightened by automatically specifying, with the learning device 10, a range of the item in each frame in the moving image prepared by the administrator.

Figure 3:
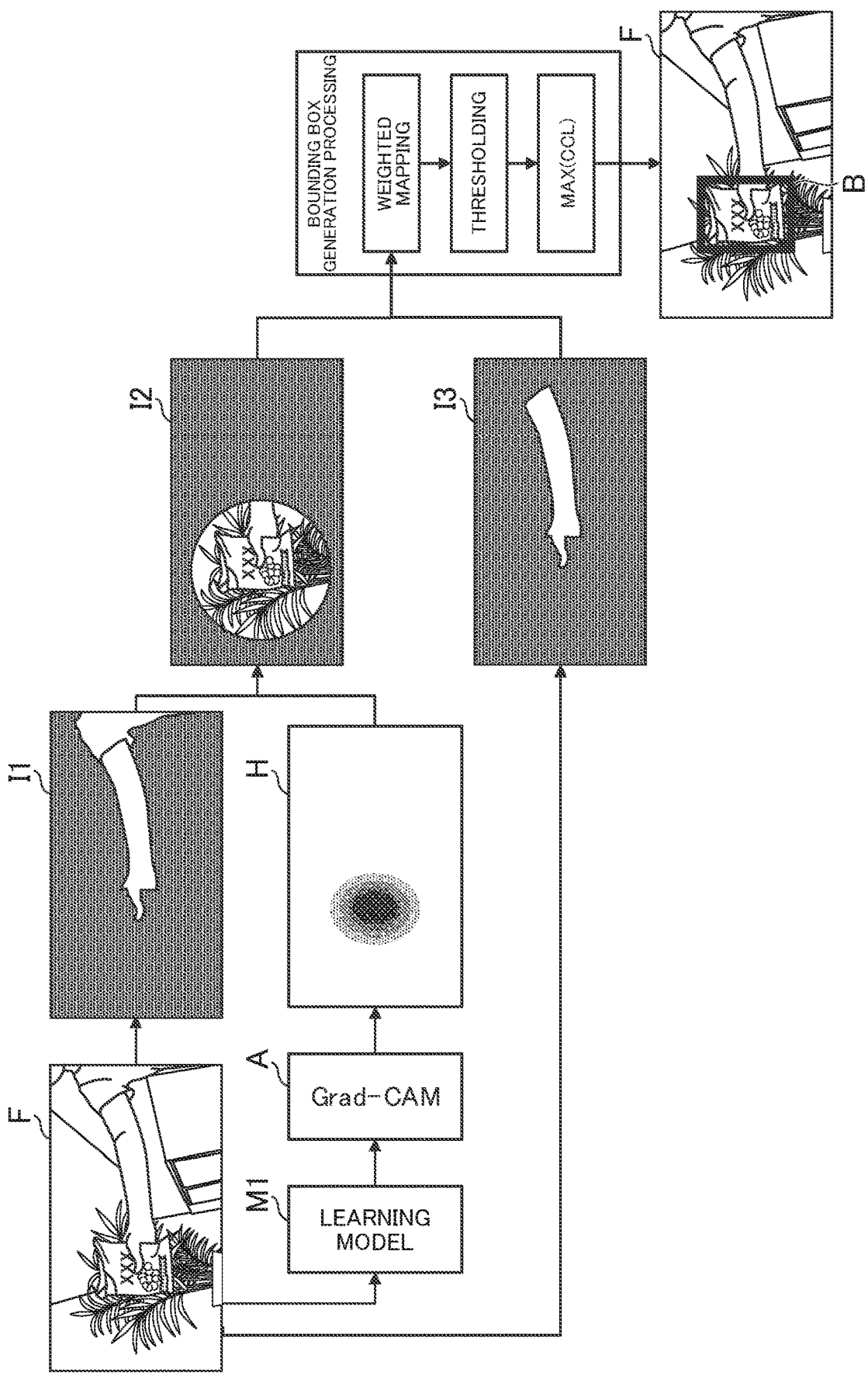
FIG. 3 is a diagram for illustrating a flow of processing executed by a learning device.

FIG. 3 is a diagram for illustrating a flow of processing executed by the learning device 10. As illustrated in FIG. 3, the learning device 10 inputs any frame F in a moving image to the learning model M1. The moving image in this embodiment is photographed in front of the vending machine 20, and a background depicted in the frame F is accordingly the same as the background of purchasing of an item by the user. The moving image may be photographed in other places.

The learning model M1 may be the same as the learning model of the vending machine 20 (hereinafter referred to as "learning model M2") but, in this embodiment, is a model different from the learning model M2 of the vending machine 20. The learning model M1 may be, similarly to the learning model M2, a classifier or a determiner. Meaning of "recognition", "object", and others in the learning model M1 is as described above.

The learning model M1 is, for example, a CNN and can recognize an object but cannot recognize a position thereof. The learning model M1 can be prepared relatively easily because, to prepare a CNN, a part to be recognized is learned as a positive example and parts other than that are learned as negative examples. Features of appearances of commercial products carried by the vending machine 20 are learned by the learning model M1.

As illustrated in FIG. 3, the learning device 10 generates a heat map H, which visualizes a part that is a basis for recognition by the learning model M1, based on a result of recognition by the learning model M1, using a Grad-CAM algorithm A. In this embodiment, a case in which means for recognizing an object (the learning model M1) and means for generating the heat map H (the Grad-CAM algorithm A) are separate is described, but those means may be integrated.

As illustrated in FIG. 3, a position that is a basis for recognition by the learning model M1 is expressed in color in the heat map H. The heat map H is, for example, an image having the same size as the size of the frame F, which is an input image, and a part that is a stronger basis for recognition (a part more prominent in terms of feature) is in a denser color. In the heat map H, a color is schematically expressed by halftone dots, with a higher density of halftone dots indicating a denser color and a lower density of halftone dots indicating a paler color.

The heat map H merely indicates a position that is a basis for the recognition, and a colored part does not always translate directly into the position of the item. For instance, the item may be partially colorless in the heat map H because a part of the item that is a strong basis for the recognition is colored and a part of the item that is a weak basis for the recognition is uncolored. When parts colored in the heat map H are used as they are for a bounding box, precision is consequently not high in many cases. For example, the overall position of an item having appearance features that are localized (a logo part at the center of the item, or the like) cannot accurately be estimated from the heat map H alone.

The learning device 10 executes motion detection processing on the frame F to acquire a motion image I1. The motion detection processing is processing of detecting a moving body in an image. The motion detection processing itself can use a known algorithm, for example, inter-frame differencing or background differencing.

In this embodiment, the moving image depicts the administrator holding an item in his or her hand and moving the item, and a motion image in which the administrator's hand and arm, the item, and other moving bodies are shown is accordingly output through the motion detection processing. The background in the frame F remains unmoving as a rule, and a part detected by the motion detection processing may therefore be called the "foreground".

As illustrated in FIG. 3, the position of a moving body in the frame F is expressed by color in the motion image I1. For example, the motion image I1 is an image sized the same as the frame F, and a larger motion translates into a brighter color.

In the motion image I1, color brightness is schematically expressed by halftone dots, with a higher density of halftone dots indicating a darker color and a lower density of halftone dots indicating a brighter color.

The learning device 10 acquires an image I2 created by adding the heat map H and the motion image I1 together.

The image I2 is an image that is a composite of the heat map H and the motion image I1, and simple addition of pixel values or addition of weighted values that are weighted in a predetermined manner may be used. For example, the image I2 is an image in which the heat map H and the motion image I1 are comprehensively taken into account, and a pixel that is a basis for recognition by the learning model M1 and at which there is a motion remains colored in the image I2. As illustrated in FIG. 3, an area around the item held in the administrator's hand accordingly remains in the image I2.

A densely colored part in the image I2 may be regarded to be the position of the item without modification, but parts that are the administrator's hand and arm are identified and removed in this embodiment. The learning device 10 executes skin detection processing on the frame F to acquire a skin image I3. The skin detection processing is processing of detecting a part that is a color of skin in an image. The skin detection processing itself may use known processing, for example, a method using color information that defines colors of skin, or a method called near-infrared skin detection.

It is assumed that, in the moving image in this embodiment, the administrator is assumed to be wearing short-sleeve clothing exposing at least hands and arms. This is because, when it is determined in advance that short-sleeve clothing is to be worn, a part that may act as noise can be removed through detection of the skin. A rule prescribing wearing of clothing of a predetermined color, instead of short-sleeve clothing, may be set. As illustrated in FIG. 3, a skin image in which the administrator's hand and arm are shown is output through the skin detection processing. The skin image I3 is, for example, an image which is sized the same as the frame F and in which only a skin-colored part out of the frame F remains.

The learning device 10 subtracts the skin image I3 from the image I2 to execute weighted mapping based on the heat map H, and executes thresholding processing. In the weighted mapping, weighting based on color density in the heat map H is set. A part that is a basis for recognition by the learning model M1 and accordingly has a relatively high reliability is therefore likely to remain after the thresholding processing is executed. In the thresholding processing, binarization is performed on the image that has undergone the weighted mapping. A part that retains color through binarization is a part that has a strong likelihood of being the item.

When there is only one area that retains color after the execution of the thresholding processing, the learning device 10 acquires a bounding box B that encloses the area. When there are a plurality of areas that retain color after the execution of the thresholding processing, the learning device 10 acquires the bounding box B that encloses the largest of the plurality of areas by connected component labeling (CCL). The bounding box B is, for example, a circumscribed rectangle of the area having a strong likelihood of being the item. In the example of FIG. 3, the bounding box B is drawn in the frame F that is finally output.

The learning device 10 acquires teaching data that uses, as input, the frame F from which the bounding box B has been acquired, and that uses, as output, the type of the recognized item and the bounding box B. The type of the item may be recognized by the learning model M1 or may be specified in advance by the administrator. When the administrator is to specify the type of the item in advance, the learning model M1 may be a determiner configured to determine whether there is an item of that type.

For example, the learning device 10 acquires the bounding box B by executing the processing illustrated in FIG. 3 for every frame F in the moving image. For the frame F from which the bounding box B has successfully been acquired, the learning device 10 acquires teaching data that uses this frame F as input, and that uses the type of the recognized item and the bounding box B as output. No teaching data is acquired for the frame F from which the bounding box B has not successfully been acquired.

The learning device 10 acquires a teaching data set including all pieces of teaching data generated from the moving image. The learning device 10 executes, based on the teaching data set, learning processing of the learning model M2 (a learning model capable of recognizing not only an object but also a position of the object) that has not been learned. The learning model M2 that has been learned is transmitted to the vending machine 20. The teaching data set includes frames in which the item is photographed at various positions and in various directions, and the learning model M2 that has been learned can accordingly recognize the type and position of the item from frames obtained by the photographing unit 26.

As described above, the object recognition system S of this embodiment acquires the bounding box B in the frame F based on the heat map H, the motion image I1, and the skin image I3. The administrator is thus freed from manual specification of the bounding box B, and the burden imposed on the administrator in generation of the teaching data can be lightened. Details of the object recognition system S are described below.

3. Functions Implemented in Object Recognition System

Figure 4:
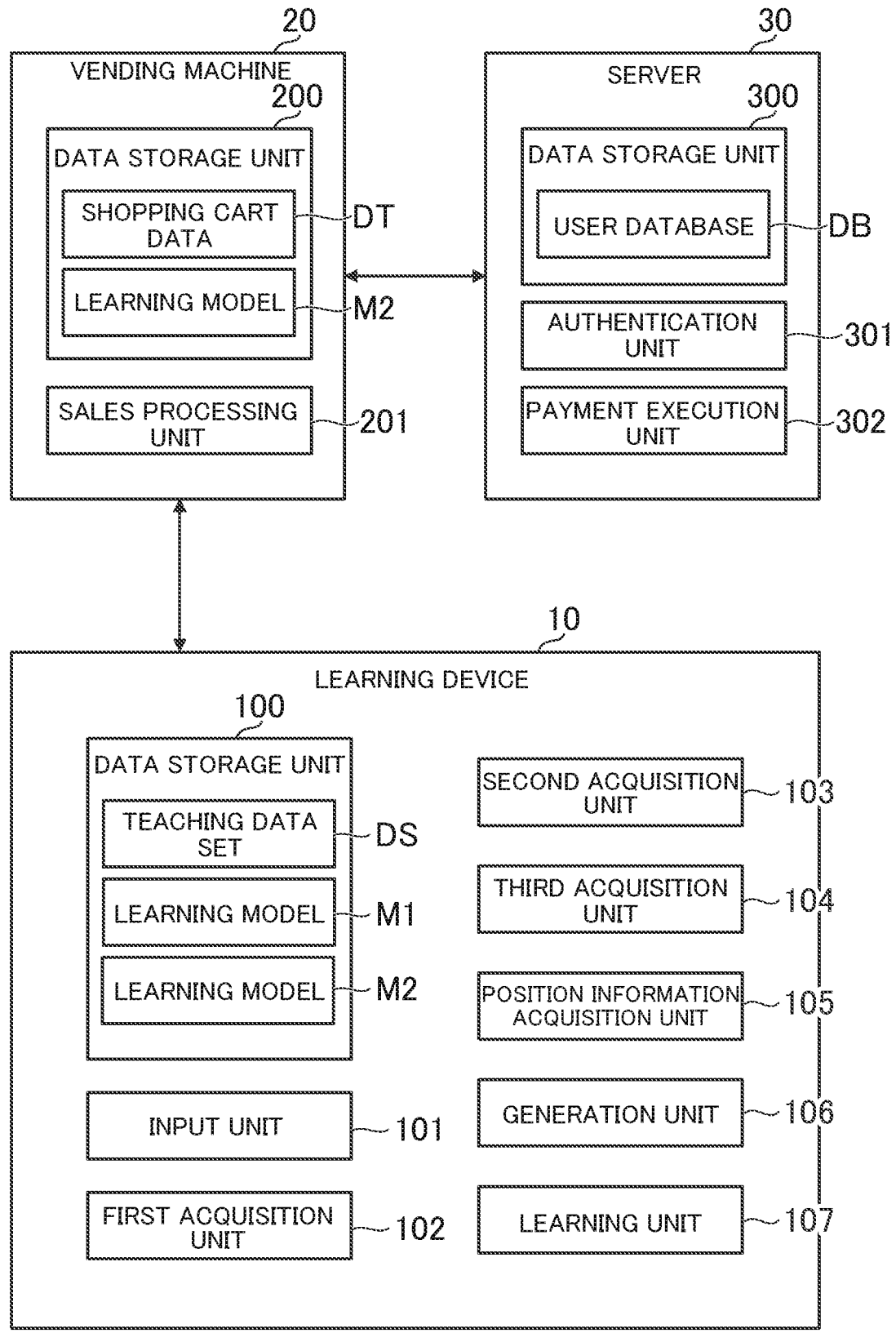
FIG. 4 is a function block diagram for illustrating an example of functions implemented in the object recognition system.

FIG. 4 is a function block diagram for illustrating an example of functions implemented in the object recognition system S. In this embodiment, functions implemented in the learning device 10, the vending machine 20, and the server 30 are separately described.

[3-1. Functions Implemented in Learning Device]

As illustrated in FIG. 4, a data storage unit 100, an input unit 101, a first acquisition unit 102, a second acquisition unit 103, a third acquisition unit 104, a position information acquisition unit 105, a generation unit 106, and a learning unit 107 are implemented in the learning device 10.

[Data Storage Unit]

The data storage unit 100 is implemented mainly by the storage unit 12. The data storage unit 100 is configured to store data that is required to execute the processing described in this embodiment. As an example of data to be stored in the data storage unit 100, a teaching data set DS and the learning models M1 and M2 are described here.

FIG. 5 is a table for showing a data storage example of the teaching data set DS. As shown in FIG. 5, the teaching data set DS stores a plurality of pieces of teaching data that includes each frame F in a moving image prepared by the administrator as well as classification information and position information of an item included in the frame F.

The teaching data is data to be used for learning in machine learning. The teaching data is also called "training data" or "learning data". The teaching data is, for example, data pairing an image that has the same format as the format of an input image with classification information and position information that are a correct answer. The teaching data is a pair of input (a question) and output (an answer). The classification information may be omitted in the case of a determiner. In machine learning, learning processing is executed with the use of a large number of pieces of teaching data.

In this embodiment, a group of a plurality of pieces of teaching data is referred to as "teaching data set DS" and each piece of data included in the teaching data set DS is referred to as "teaching data". In the description of this embodiment, "teaching data" accordingly means the pair described above, and "teaching data set" means a group of pairs. In the data storage example of FIG. 5, each frame F corresponds to input, and the classification information and the position information correspond to output. The teaching data set DS is shown in a table format, and each record corresponds to the teaching data.

The classification information is information about the type of an item included in the frame F. The classification information is expressed in FIG. 5 in the name of the item, for example, "Snack XXX", but may be expressed in symbols or numerical values for identifying the item. For example, the classification information may be code information by which the item is identified.

The position information is information about the position of the item in the frame F. In this embodiment, the position of the item is indicated by the bounding box B and the position information is accordingly information by which the bounding box B in the frame F is identified. For example, the position information indicates a position, shape, and size of the bounding box B.

In this embodiment, the bounding box B has a rectangular shape, and the position information accordingly includes information by which the rectangular shape is identifiable. For example, the position information includes coordinates of four corners of the rectangle indicated by the bounding box B. Other types of information may be used to identify the bounding box B, for example, coordinates of a vertex or a center point, a longitudinal width, and a lateral width. When the bounding box B has a fixed shape and a fixed size, the position information may indicate only the coordinates of a vertex or a center point.

The teaching data set DS may be generated as a data set for each item type separately, or may be generated as one data set in which items of a plurality of types are compiled.

The data storage unit 100 is also configured to store programs (algorithms), parameters, and the like of the learning models M1 and M2. For example, the data storage unit 100 stores the learning model M1 learned with the use of a general teaching data set for object recognition. Learning processing of the learning model M1 may be executed by the learning device 10, or another computer. The data storage unit 100 also stores, for example, the learning model M2 learned (adjusted in parameters) with the use of the teaching data set DS. The learning processing of the learning model M2 that has not been learned is executed by the learning unit 107 described later.

Data stored in the data storage unit 100 is not limited to the examples described above. For instance, the data storage unit 100 may store a moving image of an item photographed by the administrator. When the vending machine 20 sells a plurality of types of items, a moving image is prepared for each item type. When there are a plurality of vending machines 20, a moving image is prepared for each vending machine 20. To give another example, the data storage unit 100 may store the learning models M1 and M2 that have not been learned (that have not been adjusted in parameters). The data storage unit 100 may also store, for example, a Grad-CAM program, a motion detection program, and a skin detection program.

[Input Unit]

The input unit 101 is implemented mainly by the control unit 11. The input unit 101 is configured to input an input image to the learning model M1, which recognizes an object. In this embodiment, a moving image photographing an item being moved is prepared, and the input image is accordingly the frame F in the moving image. In the description of this embodiment, the frame F that is input to the learning model M1 can therefore be read as "input image".

The input image is not limited to the frame F in a moving image and may be a still image. In this case, the administrator takes a still image, not a moving image, of the item. For example, the administrator utilizes a continuous shooting mode of a camera to take serial shots of an item being moved, and thus generates a plurality of still images. Each of the plurality of still images corresponds to the input image.

The input unit 101 may input every frame F included in the moving image to the learning model M1, or may input only some frames that are each the frame F to the learning model M1. When the learning model M1 is a classifier, for example, a feature amount of the input frame F is calculated and the classification information indicating a class that is based on the calculated feature amount is output. When the learning model M1 is a determiner, for example, a feature amount of the input frame F is calculated and a result of determining whether there is an item based on the calculated feature amount is output.

[First Acquisition Unit]

The first acquisition unit 102 is implemented mainly by the control unit 11. The first acquisition unit 102 is configured to acquire the heat map H on a position that is a basis for recognition by the learning model M1, to which the frame F is input. The heat map H is an example of the first information. In the description of this embodiment, "heat map H" can therefore be read as "first information".

The first information is information by which a position that is a basis for the recognition is identifiable. A basis for the recognition may be rephrased as a place to which the learning model M1 pays attention in the recognition, or a characteristic part in the input image. The first information is not limited to the heat map H and may be, for example, coordinate information indicating a position that is a basis for the recognition, or area information about an area including a position that is a basis for the recognition.

For example, the first information is information by which a value indicating a strength as a basis for recognition by the learning model M1 is identifiable for each pixel in the input image. The strength as a basis can be said as the degree of basis, the degree of certainty, or the likelihood. For example, a larger value indicating the strength as a basis means a higher level of strength as a basis. In this embodiment, a case in which pixels in the input image and a value indicating the strength as a basis are associated on a one-to-one basis in the first information is described. The pixel-value association, however, is not required be one to one. Pixels in the input image and a value indicating the strength as a basis are only required to be associated on an N-to-1 basis (N is a natural number), and a value indicating the strength as a basis may be associated with, for example, every four pixels.

When the first information is the heat map H as in this embodiment, the first information is a first image, which is sized the same as the frame F and in which a position that is a basis for recognition by the learning model M1 is expressed in color. The heat map H is an example of the first image, and the first image may be called by another name. The size of the first image may slightly differ from the size of the frame F that is the input image.

For example, the first acquisition unit 102 uses Grad-CAM to acquire the heat map H. Grad-CAM is a method in which any point on a feature map calculated by the learning model M1 is selected, a gradient of the selected point is changed, and, based on a magnitude of a resultant change in output, an important position that is a basis for recognition by the learning model M1 is identified.

In Grad-CAM, attention is focused on the fact that a position having a significant influence on recognition by the learning model M1 is large in the amount of gradient change as well. For example, the first acquisition unit 102 generates the heat map H after acquiring a recognition result (a classification result in the case of a classifier and a determination result in the case of a determiner) that is finally output from the learning model M1, based on both of the recognition result and the feature map, which is intermediate output of the learning model M1.

A known technology is usable for the method of generating the heat map H with the use of Grad-CAM itself, and details thereof including a mathematic expression that is used in the generation of the heat map H (https://arxiv.org/abs/1610.02391, "Grad-CAM: Visual Explanations from Deep Networks via Gradient-Based Localization") are therefore omitted here. Other than Grad-CAM, Grad-CAM++, Guided Grad-CAM, or Smooth Grad may be used to generate the heat map H.

In this embodiment, the learning model M1 is a model (for example, a CNN) including at least one convolutional layer, and the first acquisition unit 102 accordingly acquires the first information based on a feature map that is output from the convolutional layer. The learning model M1 may be a model including no convolutional layer. In this case, the first acquisition unit 102 identifies the first information based on the recognition result output from the learning model M1, without using a feature map.

Although the heat map H is given in this embodiment as an example of the way to visualize output of the learning model M1, the first information may be any type of information equivalent to the heat map H. For example, the first information may be data having a format other than the image format, and may be data having a table format, a CSV format, or the like. It is sufficient for the first information to be information by which a value (a value indicating the strength of a basis) associated with a pixel or pixels in the input image is identifiable, and to have an element (a value) associated with a pixel or pixels in the input image. For example, the first information may be data having a matrix format that is the same as the input image in width and height, or data having a vector format that has as many elements as a number determined by the width and height of the input image. The first information is thus not limited to an image.

[Second Acquisition Unit]

The second acquisition unit 103 is implemented mainly by the control unit 11. The second acquisition unit 103 is configured to acquire the motion image I1, which is about a moving body included in the frame F or a position of the foreground. The motion image I1 is an example of second information. In the description of this embodiment, "motion image I1" can therefore be read as "second information".

The moving body is an object that moves. In other words, the moving body is a part that undergoes color shifts in the frame F. For example, a part having a color that shifts from the color in the immediately preceding frame F by an amount equal to or more than a threshold value is a part that is the photographed moving body. In the moving image prepared by the administrator, the background and the torso of the administrator remain unmoving as a rule, and, accordingly, an item held by the administrator and the administrator's hands and arms are each a moving body.

The foreground is a part other than the background. In other words, the foreground is an object closer to the camera than the background is. For example, out of objects photographed in the frame F, an object closest to the camera excluding a floor, walls, and a ceiling is the foreground. In the moving image prepared by the administrator, no objects are closer to the camera than the administrator and the item are, and, accordingly, the item held by the administrator and the entire body of the administrator each correspond to the foreground. The foreground is not limited to moving bodies and may be a stationary object. In this case, the foreground is detected by a known foreground detection method instead of motion detection.

The second information is information by which the position of a moving body or of the foreground is identifiable. The second information is not limited to the motion image I1 and may be, for example, coordinate information indicating the position of a moving body or of the foreground, or area information about an area that includes the position of a moving body or of the foreground.

For example, the second information is information by which a value indicating a strength as a moving body or the foreground is identifiable for each pixel in the input image. The strength as a moving body or the foreground can be said as the degree of certainty or likelihood of being a moving body or the foreground. For example, a larger value indicating the strength as a moving body or the foreground means a higher level of strength as a moving body or the foreground (a higher probability of being a moving body or the foreground). As is the case for the first information, it is sufficient for the second information to associate pixels in the input image and a value indicating the strength as a moving body or the foreground on an N-to-1 basis.

When the second information is the image as in this embodiment, the second information is a second image, which is sized the same as the input image and in which the position of the moving body or the foreground is expressed in color. The motion image I1 is an example of the second image, and the second image may be called by another name. The size of the second image may slightly differ from the size of the frame F.

For example, the second acquisition unit 103 generates the motion image I1 from the frame F that is the input image, based on the inter-frame differencing or background differencing described above, or a similar algorithm. Other methods may be used to identify a moving body or the foreground, and the second acquisition unit 103 may use, for example, a depth camera in the detection of a moving body or the foreground. In this case, a part that undergoes a great change in depth may be regarded to be a moving body, and a part that has a depth less than a threshold value may be regarded to be the foreground. As is the case for the first information, the second information may be data other than image format data, for example, table format data, CSV format data, matrix format data, or vector format data. The first information and the second information may have the same data format or different data formats.

[Third Acquisition Unit]

The third acquisition unit 104 is implemented mainly by the control unit 11. The third acquisition unit 104 is configured to acquire the skin image I3, which is about a position of another object that grasps the item included in the frame F. The skin image I3 is an example of third information. In the description of this embodiment, "skin image I3" can therefore be read as "third information."

In this embodiment, the administrator grasps an item and the administrator's body accordingly corresponds to the another object. In the description of this embodiment, the body of the administrator grasping an item can therefore be read as "another object". The another object is not limited to the administrator's body and can be any object. For example, when an item is to be grasped by a robot, the robot corresponds to the another object. When the administrator uses a rod to grasp an item, the rod corresponds to the another object.

The third information is information by which the position of another object is identifiable. The third information is not limited to the skin image I3 and may be, for example, coordinate information indicating the position of another object, or area information about an area that includes the position of another object.

For example, the third information is information by which a value indicating a strength as the position of another object is identifiable for each pixel in the input image. The strength as another object can be said as the degree of certainty or likelihood of being another object. For example, a larger value indicating the strength as another object means a higher level of strength as another object (a higher probability of being another object). As is the case for the first information and the second information, it is sufficient for the third information to associate pixels in the input image and a value indicating the strength as the position of another object on an N-to-1 basis.

When the third information is the image as in this embodiment, the third information is a third image, which is sized the same as the input image and in which the position of the another object is expressed in color. The skin image I3 is an example of the third image, and the third image may be called by another name. For example, when the another object is a robot, the third image is an image in which a robot arm grasping an item is shown. To give another example, when the another object is a rod, a rod grasping an item is shown in the third image. The size of the third image may slightly differ from the size of the frame F.

For example, the third acquisition unit 104 generates the skin image I3 from the frame F that is the input image, based on the skin detection method described above. Identification of the skin image I3 may use other methods, and the third acquisition unit 104 may use, for example, thermography to detect the administrator's skin. In this case, a part retaining a certain degree of heat is detected as skin. As is the case for the first information and the second information, the third information may be data other than image format data, for example, table format data, CSV format data, matrix format data, or vector format data. The third information may also be, for example, data having the same format as the data format of the first information and the second information, or may be data having a different format.

[Position Information Acquisition Unit]

The position information acquisition unit 105 is implemented mainly by the control unit 11. The position information acquisition unit 105 is configured to acquire position information about the position of an object included in the frame F, based on the heat map H and the motion image I1. In this embodiment, a case in which information about the bounding box B including an item corresponds to the position information is described. In the description of this embodiment, information of the bounding box B can therefore be read as "position information".

The position information is information by which the position of an object is identifiable. The position information is not limited to information of the bounding box B, and may be, for example, coordinate information indicating the position of an object, or area information about an area that includes the position of an object. That is, the position information may be information indicating the position of an object in a pinpoint manner, or information indicating a certain range of area that includes an object. The area in the area information is not limited to rectangular shapes like the shape of the bounding box B, and may have any shape. For example, the area in the area information may have a shape of a triangle, a pentagon and polygons of higher order, a circle, or an ellipse, or may have a shape that is not particularly classified as one of those. For instance, an outline identified by edge detection may be used to express the position of an object.

In this embodiment, the position information acquisition unit 105 acquires the position information based on a result of adding together, with a use of a predetermined mathematical expression, a value identified from the heat map H as a value that is associated with a pixel or pixels in the frame F and a value identified from the motion image I1 as a value that is associated with a pixel or pixels in the frame F.

In this embodiment, the heat map H and the frame F are images of the same size, and a value identified from the heat map H as a value that is associated with a pixel or pixels in the frame F is accordingly a pixel value of a pixel that is located at the same position as the position of one of the pixels in the frame F. As described above, the heat map H and the frame F may not be images of the same size, and the first information corresponding to the heat map H may have a format other than the image format. It is therefore sufficient to configure the first information so that a value associated with a pixel or pixels in the frame F that is the input image is identifiable.

Similarly, in this embodiment, the motion image I1 and the frame F are images of the same size, and a value identified from the motion image I1 as a value that is associated with a pixel or pixels in the frame F is accordingly a pixel value of a pixel that is located at the same position as the position of one of the pixels in the frame F. As described above, the motion image I1 and the frame F may not be images of the same size, and the second information corresponding to the motion image I1 may have a format other than the image format. It is therefore sufficient to configure the second information so that a value associated with a pixel or pixels in the frame F that is the input image is identifiable.

The mathematical expression mentioned above can be any expression, and may be simple addition of pixel values or addition of values weighted in a predetermined manner. For example, the weighting may be heavier in the heat map H than in the motion image I1 or, conversely, the weighting may be heavier in the motion image I1 than in the heat map H.

The position information acquisition unit 105 acquires the image I2 by, for example, retaining a part of the frame F in which the sum of a pixel value in the heat map H and a pixel value in the motion image I1 is equal to or more than a threshold value. In the example of FIG. 3, the sum pixel value in a surrounding area including the item is equal to or more than the threshold value, and the area accordingly remains in the image I2. As described above, some parts of the area of the item are not colored in the heat map H and accordingly, by additionally taking the motion image I1 into account, the item can be retained without missing a part of the item that does not appear on the heat map H. It may therefore be said that the position information acquisition unit 105 expands a part shown in the heat map H as a part high in objectness by utilizing the motion image I1.

In this embodiment, the skin part, which is the administrator's skin, is removed and the position information acquisition unit 105 therefore acquires the position information based further on the skin image I3. That is, the position information acquisition unit 105 acquires the position information based on the heat map H, the motion image I1, and the skin image I3.

For example, the position information acquisition unit 105 acquires the position information based on a result of adding together, with a use of a predetermined mathematical expression, a value identified from the heat map H as a value that is associated with a pixel or pixels in the frame F and a value identified from the motion image I1 as a value that is associated with a pixel or pixels in the frame F, and subtracting, with a use of a predetermined mathematical expression, a value identified from the skin image I3 as a value that is associated with a pixel or pixels in the frame F.

In this embodiment, the skin image I3 and the frame F are images of the same size, and a value identified from the skin image I3 as a value that is associated with a pixel or pixels in the frame F is accordingly a pixel value of a pixel that is located at the same position as the position of one of the pixels in the frame F. As described above, the skin image I3 and the frame F may not be images of the same size, and the third information corresponding to the skin image I3 may have a format other than the image format. It is therefore sufficient to configure the third information so that a value associated with a pixel or pixels in the frame F that is the input image is identifiable.

The mathematical expression mentioned above can be any expression and may be simple subtraction of a pixel value. In the example of FIG. 3, the skin part is removed by subtracting a part that is colored in the skin image I3 from an area that retains color in the image I2. The position information acquisition unit 105 prevents the administrator's hand and arm illustrated in the skin image I3 from being acquired as a part of the item.

The position information acquisition unit 105 may also acquire the position information based further on, for example, weighting that is based on the heat map H. In the example of FIG. 3, the position information acquisition unit 105 performs weighted mapping that is weighted based on color density in the heat map H on the result of subtraction of the skin image I3 from the image I2. This emphasizes a part that is colored in the heat map H, to thereby increase the chance of a part that is a basis of the learning model M1 remaining through the subsequent thresholding processing. For example, in an image that is the difference of the subtraction of the skin image I3 from the image I2, the position information acquisition unit 105 increases a pixel value in a part that is colored in the heat map H. The amount of increase in pixel value is larger in a part that has a denser color in the heat map H.

In this embodiment, when a plurality of areas that are candidates are acquired, the position information acquisition unit 105 acquires the position information based on a candidate that has the largest size out of the plurality of candidates. The position information acquisition unit 105 compares sizes of the plurality of candidates for the bounding box B, and determines the largest candidate as the bounding box B. The size may mean planar dimensions or at least one of the longitudinal width and the lateral width.

The position information acquisition unit 105 may acquire, in addition to the largest candidate, a plurality of candidates in descending order of size to acquire all of those as the bounding box B.

The position information acquisition unit 105 in this embodiment acquires the position information for each frame F. The position information acquisition unit 105 may acquire the position information for every frame F included in the moving image, or for some frames that are each the frame F. The position information is not acquired for the frame F in which the bounding box B is not acquired.

[Generation Unit]

The generation unit 106 is implemented mainly by the control unit 11. The generation unit 106 is configured to generate, based on the frame F and on the position information, teaching data for learning processing of the learning model M2 (the learning model M2 that has not been learned), which recognizes the position of an item. The learning model M2 is an example of another learning model. In the description of this embodiment, "learning model M2" can therefore be read as "another learning model". The another learning model is a model that is not the learning model M1 used to generate the teaching data set DS.

In this embodiment, the position information is generated for each frame F included in the moving image, and the generation unit 106 accordingly generates teaching data for each frame F. The generation unit 106 generates teaching data for each frame F that is one of a plurality of frames in which the bounding box B has been acquired. The generation unit 106 generates the teaching data set DS in which those pieces of teaching data are compiled, and records the teaching data set DS in the data storage unit 100. The generation unit 106 generates teaching data for each moving image because the administrator prepares a moving image for each item type. As described above, the teaching data set DS may be provided for each item type separately, or one teaching data set DS in which pieces of data for all items are compiled may be provided.

[Learning Unit]

The learning unit 107 is implemented mainly by the control unit 11. The learning unit 107 is configured to execute learning processing of the learning model M2 (the learning model M2 that has not been learned), which is the another learning model and recognizes the position of an object, based on the teaching data that is generated based on the frame F and the position information. The learning unit 107 executes the learning processing based on the teaching data set DS, which includes a plurality of pieces of teaching data generated from moving images. The learning unit 107 adjusts parameters of the learning model M2 that has not been learned so that the input-output relationship of the teaching data included in the teaching data set DS is obtained. Various known methods are usable for the learning processing itself and, for example, a method used in a neural network and in similar applications may be used.

[3-2. Functions Implemented in Vending Machine]

As illustrated in FIG. 4, a data storage unit 200 and a sales processing unit 201 are implemented in the vending machine 20.

[Data Storage Unit]

The data storage unit 200 is implemented mainly by the storage unit 22. The data storage unit 200 is configured to store data required for sales of commercial products. As an example of data to be stored in the data storage unit 200, shopping cart data DT and the learned learning model M2 are described here. The learned learning model M2 stored in the data storage unit 200 is the same as the learned learning model M2 stored in the data storage unit 100.

FIG. 6 is a table for showing a data storage example of the shopping cart data DT. As shown in FIG. 6, the shopping cart data DT is data indicating an item taken out by a user. The shopping cart data DT stores, for example, a user ID of a user who has successfully been authenticated by face authentication, an item ID of an item taken out by the user, an item name, a quantity, and a unit price. The shopping cart data DT is generated when a user is successfully authenticated by face authentication, and is updated based on a result of recognition of an item taken out by the user.

Data stored in the data storage unit 200 is not limited to the example given above. For instance, the data storage unit 200 may store a commercial product database about commercial products carried by the vending machine 20. The commercial product database stores, for example, an item ID, an item name, a unit price, and an in-stock quantity.

[Sales Processing Unit]

The sales processing unit 201 is implemented mainly by the control unit 21. The sales processing unit 201 is configured to execute various types of processing related to sales of commercial products. For example, the sales processing unit 201 displays operation steps of the vending machine 20 and various messages on the display unit 25. To give another example, the sales processing unit 201 transmits a frame generated by the photographing unit 26 in face authentication to the server 30. Still another example of processing executed by the sales processing unit 201 is door unlocking based on an authentication result received from the server 30.

To give yet still another example, the sales processing unit 201 inputs a frame generated by the photographing unit 26 to the learned learning model M2, and acquires the classification information and the position information that are output from the learned learning model M2. The sales processing unit 201 updates the shopping cart data DT based on the classification information and the position information. Each time a frame is acquired, the sales processing unit 201 inputs the frame to the learned learning model M2 to acquire the classification information and the position information.

For example, the sales processing unit 201 stores, in the shopping cart data DT, an item ID, an item name, and a unit price that are based on the classification information output from the learned learning model M2. When the user takes out a plurality of the same commercial products, the bounding box B is acquired for each of the plurality of the commercial products, and the sales processing unit 201 accordingly stores a quantity corresponding to the number of pieces of position information in the shopping cart data DT. When the user takes out a plurality of types of commercial products, as many pieces of classification as the number of the plurality of types of commercial products are output, and the sales processing unit 201 accordingly stores, for each piece of output classification information, an item ID, an item name, a quantity, and a unit price in the shopping cart data DT.

To give yet still another example, when output of the classification information stops at one point, the sales processing unit 201 identifies a moving direction of the item based on changes of the position information up to that point. The sales processing unit 201 determines that the item has been returned when the moving direction of the item is a downward direction headed below the frame (a direction of a near side of the photographing unit 26). In this case, the sales processing unit 201 deletes the item determined to be a returned item from the shopping cart data DT.

When the moving direction of the item is another direction, on the other hand, the sales processing unit 201 determines that the item remains taken out, and keeps the contents of the shopping cart data DT as they are. As the relationship between a moving direction of the item and contents of the processing described above, a relationship suited to the installation location of the photographing unit 26 is defined in advance. For example, the sales processing unit 201 may determine that the item has been returned when the bounding box B of the item becomes gradually larger and then vanishes, depending on the installation location of the photographing unit 26.

To give yet still another example, the sales processing unit 201 transmits the shopping cart data DT to the server 30 when the door is closed. The opening and closing of the door may be detected by a sensor provided on the vending machine 20. The sales processing unit 201 displays a result of executing payment processing by the server 30 on the display unit 25. The sales processing unit 201 locks the door when the door is closed.

[3-3. Functions Implemented in Server]

As illustrated in FIG. 4, a data storage unit 300, an authentication unit 301, and a payment execution unit 302 are implemented in the server 30.

[Data Storage Unit]

The data storage unit 300 is implemented mainly by the storage unit 32. The data storage unit 300 is configured to store data about users. As an example of data to be stored in the data storage unit 300, a user database DB is described here.

FIG. 7 is a table for showing a data storage example of the user database DB. As shown in FIG. 7, the user database DB is a database in which various types of information about users who have completed user registration are stored. The user database DB stores, for example, a user ID, a name, a password, a face image, a face feature amount, and payment information. In this embodiment, a case in which credit card information corresponds to the payment information is described. The payment information, however, may be any information, for example, an account for electronic money, a reward point, or a virtual currency. When a user completes predetermined user registration, a new record is created in the user database DB, and those pieces of information registered by the user are stored in the record.

[Authentication Unit]

The authentication unit 301 is implemented mainly by the control unit 31. The authentication unit 301 is configured to perform authentication of a user. For example, the authentication unit 301 extracts a face feature amount from a frame received from the vending machine 20, and determines whether a similar feature amount is found in the user database DB. When a similar feature amount is found, the authentication unit 301 determines that face authentication is a success. In the case of expressing the face feature amount with vector information, for example, face authentication is a success when a distance in a vector space is less than a threshold value. When authentication other than face authentication is used, the authentication unit 301 may perform authentication following steps that are defined in an authentication method to be used.

[Payment Execution Unit]

The payment execution unit 302 is implemented mainly by the control unit 31. The payment execution unit 302 is configured to execute payment of a commercial product. For example, the payment execution unit 302 calculates a payment amount based on the shopping cart data DT received from the vending machine 20. The payment execution unit 302 refers to the user database DB, to thereby execute payment processing for settling the calculated payment amount, based on payment information that is associated with a user ID stored in the shopping cart data DT. The payment execution unit 302 transmits a result of executing the payment processing to the vending machine 20.

4. Processing Executed in Object Recognition System

Processing to be executed in the object recognition system S is described next. In this embodiment, learning processing in which the learning device 10 generates the teaching data set DS to be used in learning of the learning model M2 that has not been learned and sales processing in which the vending machine uses the learned learning model M2 to sell a commercial product are described.

[4-1. Learning Processing]

Figure 8:
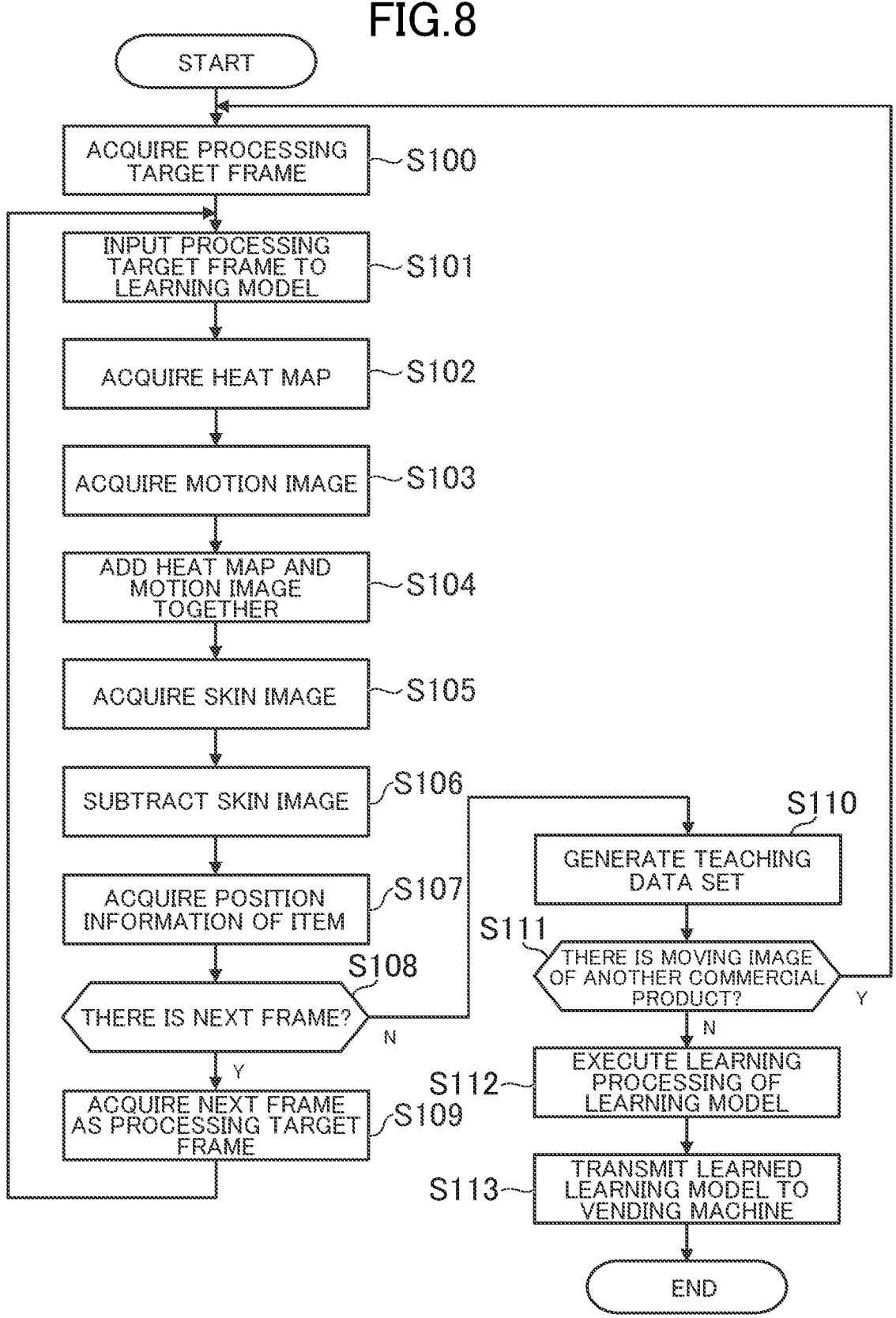
FIG. 8 is a flow chart for illustrating an example of learning processing.

FIG. 8 is a flow chart for illustrating an example of learning processing. The learning processing is executed by operation of the control unit 11 that follows a program stored in the storage unit 12. Processing described below is an example of processing that is executed by the function blocks illustrated in FIG. 4. It is assumed here that, prior to the execution of the processing described below, a moving image photographing a commercial product that is being held and moved by the administrator is stored in the storage unit 12.

As illustrated in FIG. 8, the control unit 11 acquires the frame F that is a processing target in any moving image prepared by the administrator (Step S100). In Step S100, the control unit 11 may acquire, as the processing target frame F, the first frame of the moving image, or the frame F at a point that is some time past the start of the moving image. The frame F at a point that is some time past the start of the moving image is acquired as the processing target frame F when, for example, inter-frame differencing is to be used in acquisition of the motion image I1.

The control unit 11 inputs, as an input image, the processing target frame F to the learning model M1 stored in the storage unit 12 (Step S101). The learning model M1 calculates a feature amount of the input processing target frame F, to thereby recognize an item included in the frame F. As described above, the learning model M1 can recognize an item but not the position of the item, and the bounding box B is therefore not output at this point in Step S101.

The control unit 11 inputs a result of the recognition by the learning model M1 and a feature map to Grad-CAM to acquire the heatmap H of the processing target frame F (Step S102). A basis for recognition of an object included in the processing target frame F by the learning model M1 is shown on the heat map H.

The control unit 11 executes the motion detection processing on the processing target frame F to acquire the motion image I1 (Step S103). A moving body or the foreground in the processing target frame F is shown in this motion image.

The control unit 11 acquires the image I2 by adding together the heat map H acquired in Step S102 and the motion image I1 acquired in Step S103 (Step S104). In Step S104, the control unit 11 acquires the image I2 by adding together a pixel value of each pixel in the heat map H and a pixel value of each pixel in the motion image I1 by a predetermined calculation expression.

The control unit 11 executes the skin detection processing on the processing target frame F, to thereby acquire the skin image I3 (Step S105). Skin parts that are the administrator's hand and arm in the processing target frame F are shown in this skin image I3.

The control unit 11 subtracts the skin image I3 acquired in Step S105 from the image I2 acquired in Step S104 (Step S106). In Step S106, the control unit 11 uses a predetermined calculation expression to subtract a pixel value of each pixel in the skin image from a pixel value of each pixel in the image I2 acquired in Step S104.

The control unit 11 acquires the position information of an item in the processing target frame F, based on a result of processing of Step S106 (Step S107). In Step S107, the control unit 11 executes mapping that is weighted based on the heat map H, and executes the thresholding processing. The control unit 11 acquires a candidate for the bounding box B from a binarized image created by the execution of the thresholding processing. When there are a plurality of candidates, the control unit 11 determines one of the plurality of candidates that is largest in size as the bounding box B, and acquires the position information.

The control unit 11 refers to the moving image to determine whether there is the next frame F (Step S108). In Step S108, the control unit 11 determines whether the moving image has reached an end of a playback time. When determining that there is the next frame F (Step S108: Y), the control unit 11 acquires the next frame F as the processing target frame F (Step S109), and returns to processing of Step S101. In this case, the control unit 11 executes the processing of Step S101 to processing of Step S107 for the next frame F, to thereby acquire the position information in the next frame F.

When determining that there is no next frame F (Step S108: N), the control unit 11 generates the teaching data set DS storing teaching data, which pairs the processing target frame F with the classification information and the position information (Step S110). In Step S110, the control unit 11 generates, for each frame F from which the bounding box B has been acquired, teaching data that uses the frame F as input and the bounding box B as output. The control unit 11 stores the teaching data of each frame F that is one of the plurality of frames from each of which the bounding box B has been acquired in the teaching data set DS.

The control unit 11 refers to the storage unit 12 to determine whether there is a moving image of another commercial product (Step S111). In Step S111, the control unit 11 determines whether there is a moving image of a commercial product for which the teaching data has not been generated. When determining that there is a moving image of another commercial product (Step S111: Y), the control unit 11 returns to the processing of Step S100. In this case, the control unit 11 executes the processing of Step S100 to processing of Step S110 for the another commercial product, to thereby generate the teaching data.

When determining that there is no moving image of another commercial product (Step S111: N), the control unit 11 executes learning processing of the learning model M2 that has not been learned, based on the teaching data set DS (Step S112). In Step S112, the control unit 11 adjusts parameters of the learning model M2 that has not been learned so that the input-output relationship of the teaching data stored in the teaching data set DS is obtained. Once the learning is finished, the learning model M2 can output type information and position information of an item included in the input image.

The control unit 11 transmits the learned learning model M2 to the vending machine 20 (Step S113), at which point this processing ends. The learned learning model M2 transmitted in Step S113 is recorded in the storage unit 22 of the vending machine 20.

[4-2. Sales Processing]

Figure 9:
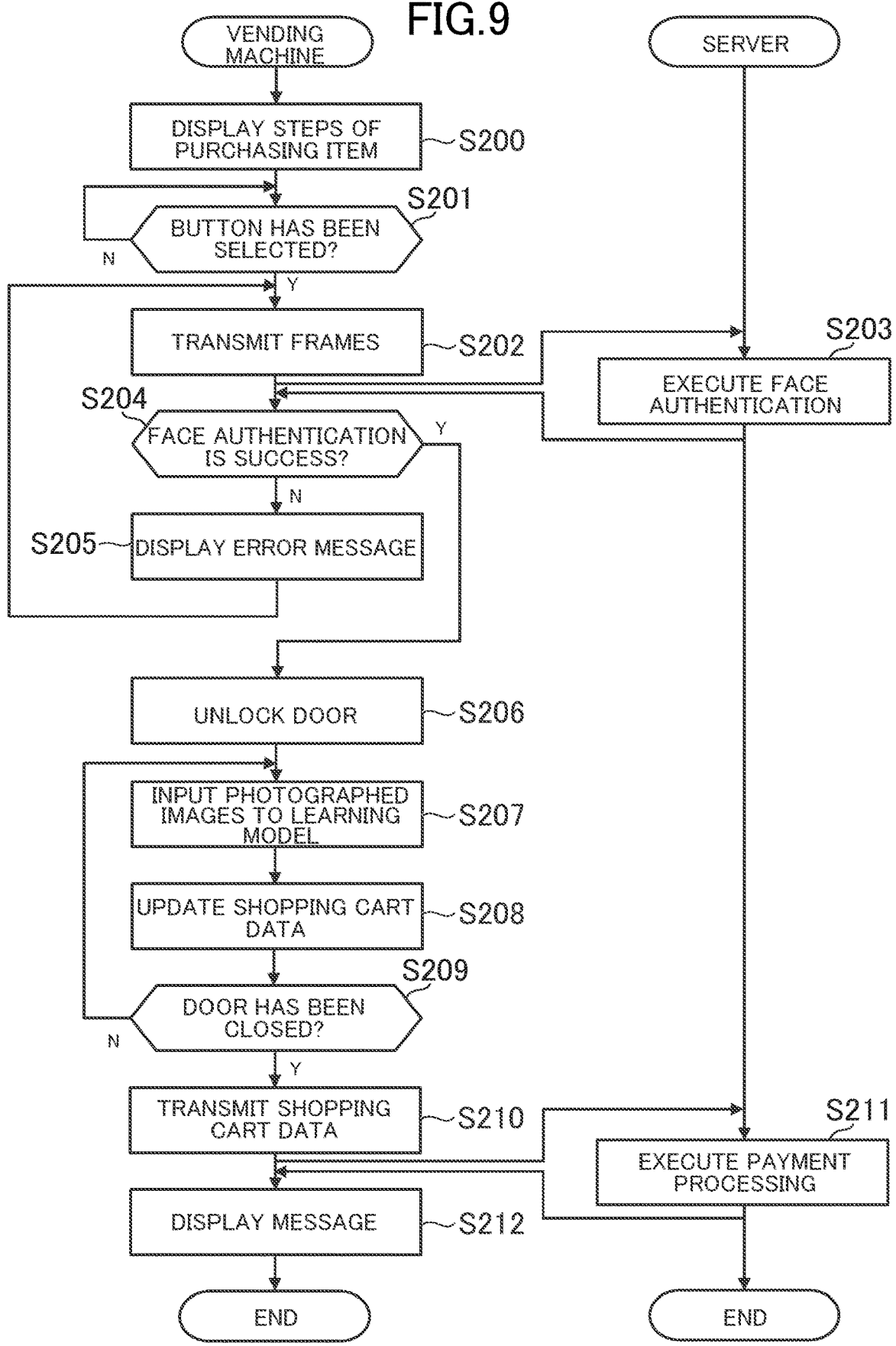
FIG. 9 is a flow chart for illustrating an example of sales processing.

FIG. 9 is a flow chart for illustrating an example of the sales processing. The sales processing is executed by operation of the control unit 21 that follows a program stored in the storage unit 22 and operation of the control unit 31 that follows a program stored in the storage unit 32. It is assumed here that, prior to the execution of the processing described below, the learning processing has been executed, with the learned learning model M2 stored in the storage unit 22.

As illustrated in FIG. 9, the vending machine 20 displays steps of purchasing an item on the display unit 25 (Step S200). The vending machine 20 determines, based on a detection signal of the operating unit 24, whether the user has selected a button for starting face authentication (Step S201). When determining that the button has been selected (Step S201: Y), the vending machine 20 takes serial shots with the photographing unit 26, and transmits frames generated in succession by the photographing unit 26 to the server 30 (Step S202).

The server 30 receives the frames, executes face authentication based on the user database DB, and transmits a result of the authentication to the vending machine 20 (Step S203). The vending machine 20 receives the result of the authentication and determines whether the face authentication is a success (Step S204). When the face authentication is a failure (Step S204: N), the vending machine 20 displays a predetermined error message on the display unit 25 (Step S205), and returns to processing of Step S202.

When the face authentication is a success (Step S205: Y), the vending machine 20 unlocks the door (Step S206). The vending machine 20 takes serial shots with the photographing unit 26, and inputs frames to the learned learning model M2 stored in the storage unit 22 (Step S207). The vending machine 20 updates the shopping cart data DT based on the classification information and the position information that are output from the learned learning model M2 (Step S208). In Step S208, the vending machine analyzes the classification information and the position information as described above to identify an item taken out by the user or an item returned to the item's original place by the user, and updates the shopping cart data DT.

The vending machine 20 determines whether the door has been closed (Step S209). When determining that the door has not been closed (Step S209: N), the vending machine 20 returns to processing of Step S207. In this case, recognition of an item by the learned learning model M2 is executed each time the photographing unit 26 generates frames. When determining that the door has been closed (Step S209: Y), the vending machine 20 transmits the shopping cart data DT to the server 30 (Step S210).

The server 30 receives the shopping cart data DT, executes the payment processing based on the user database DB, and transmits a result of executing the payment processing (Step S211). The vending machine 20 receives the result of executing the payment processing, and displays a message based on the execution result on the display unit 25 (Step S212), at which point this processing ends.

According to the object recognition system S described above, the administrator is freed from manual specification of the position of an item by acquiring, based on the heat map H and the motion image I1, the position information about the position of the item included in the frame F, and the burden on the administrator in object recognition can thus be lightened. In addition, while manual specification of the position of the item by the administrator has a possibility of erroneous operation, the position information can accurately be specified by executing the processing of acquiring the position information with the learning device 10. Even more precise position information can be acquired when there is little change in illumination and when the background changes little as in the case of installing the vending machine 20 indoor. Acquisition of even more precise position information is possible also when a rule prescribing that the administrator wear short-sleeve clothing or a similar rule is set. Teaching data of even higher precision can be generated by thus establishing an environment for teaching data generation in advance.

The object recognition system S acquires the position information based on the first information capable of identifying, for each pixel in the frame F, a value that indicates a strength as a basis for recognition by the learning model M1, and the second information capable of identifying, for each pixel in the frame F, a value that indicates a strength as a moving body or the foreground. This enables the object recognition system S to acquire the position information through simple processing by using the information in which those values are associated with a pixel or pixels in the frame F. Processing of acquiring the position information is accordingly sped up and a processing load on the learning device 10 can be lightened.

The object recognition system S can acquire the position information through even simpler calculation by acquiring the position information based on a result of adding together, with the use of a predetermined mathematical expression, the value identified from the heat map H as a value that is associated with a pixel or pixels in the frame F and the value identified from the motion image I1 as a value that is associated with a pixel or pixels in the frame F. The processing of acquiring the position information is accordingly sped up and the processing load on the learning device 10 can be lightened.

The object recognition system S acquires the position information based further on the skin image that deals with the position of the administrator grasping an item included in the frame F. Parts that correspond to the administrator's hand and arm and may become noise in the acquisition of the position information are thus removed, and the precision of the position information can accordingly be enhanced.

The object recognition system S acquires the position information based on the first information by which the value indicating a strength as a basis for recognition by the learning model M1 is identifiable for each pixel in the frame F, the second information by which the value indicating a strength as a moving body or the foreground is identifiable for each pixel in the frame F, and the third information by which the value indicating a strength as the position of another object is identifiable for each pixel in the frame F. This enables the object recognition system S to acquire the position information through simple processing by using the information in which those values are associated with a pixel or pixels in the frame F. The processing of acquiring the position information is accordingly sped up and the processing load on the learning device 10 can be lightened.

The object recognition system S acquires the position information by adding together, with the use of a predetermined mathematical expression, the value identified from the heat map H as a value that is associated with a pixel or pixels in the frame F and the value identified from the motion image I1 as a value that is associated with a pixel or pixels in the frame F, and subtracting, with the use of a predetermined mathematical expression, the value identified from the skin image I3 as a value that is associated with a pixel or pixels in the frame F.

This enables the object recognition system S to acquire the position information through even simpler calculation. The processing of acquiring the position information is accordingly sped up and the processing load on the learning device 10 can be lightened.

The object recognition system S acquires the position information based further on weighting that is based on the heat map H, to thereby ensure that a part that is a basis for recognition by the learning model M1 remains. The precision of the position information can accordingly be enhanced.

The object recognition system S acquires a plurality of candidates for the bounding box B and acquires the position information based on one of the plurality of candidates that has the largest size, to thereby acquire the position information of the bounding box B that includes the entire item. The precision of the position information can accordingly be enhanced.

The object recognition system S can also easily generate the learning model M2 for recognizing the position of an object, by executing learning processing of the learning model M2 that has not been learned based on teaching data that is generated based on the frame F and the position information. This lightens the burden imposed on the administrator in teaching data generation as well.

The object recognition system S executes learning processing based on the teaching data set DS, which includes a plurality of pieces of teaching data generated from moving images, to thereby accomplish learning of more pieces of teaching data by the learning model M2 that has not been learned. The precision of the learned learning model M2 can thus be enhanced.

The object recognition system S can also effectively lighten the burden on the user by acquiring the position information with the use of the learning model M1, which is a classifier configured to classify the types of commercial products or a determiner configured to determine whether a commercial product is present.

The object recognition system S can also lighten the user's burden of specifying the bounding box B, by acquiring, as the position information, information about the bounding box B including an item.

5. Modification Examples

The present disclosure is not limited to the embodiment described above, and can be modified suitably without departing from the spirit of the present disclosure.

(1) For example, although only one commercial product is photographed in a moving image created by the administrator in the case described above, a plurality of types of commercial products may be photographed concurrently in the moving image. That is, each frame F may include a plurality of types of commercial products. In this case, the position information acquisition unit 105 may acquire the position information for each type of commercial product included in the frame F.

The position information acquisition unit 105 may acquire the bounding box B for each of positions which are at a predetermined distance from each other and at which a plurality of candidates for the bounding box B are acquired by the same method as the method described in the embodiment. For example, when the administrator is holding and moving items that are the same commercial product in his or her right hand and left hand, the position information acquisition unit 105 acquires a plurality of bounding boxes B for the same commercial product from one frame F.

When the administrator is holding and moving different types of commercial products in his or her right hand and left hand, for example, the position information acquisition unit 105 acquires the bounding box B for each of the plurality of types of commercial products from one frame. In this case, it is assumed that the learning model M1 is capable of recognizing a plurality of types of commercial products. One Grad-CAM algorithm is prepared for each commercial product type. The heat map H is output for each commercial product type.

According to Modification Example (1) of the present disclosure, accurate position information can be acquired even when the frame F includes a plurality of types of commercial products, by acquiring the position information for each type of commercial product included in the frame F. The burden on the user can thus effectively be lightened.

Figure 10:
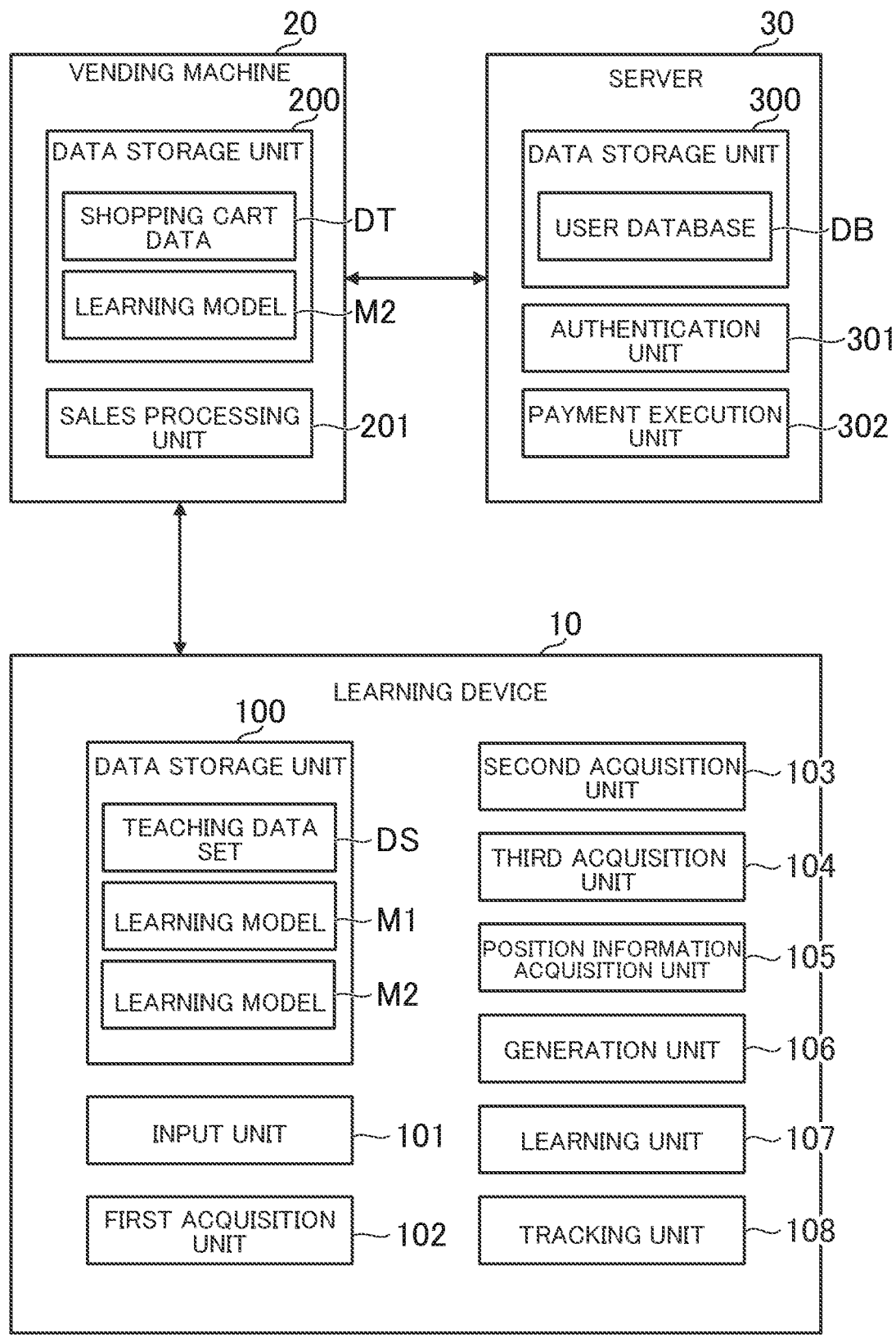
FIG. 10 is a function block diagram in Modification Example (2) of the present disclosure.

(2) For example, the bounding box B may be used to track an item enclosed by the bounding box B. FIG. 10 is a function block diagram in Modification Example (2) of the present disclosure. As illustrated in FIG. 10, a tracking unit 108 is implemented in Modification Example (2). The tracking unit 108 is implemented mainly by the control unit 11. The tracking unit 108 is configured to track an item included in a moving image, based on the position information.

"Tracking" means a search for an area resembling an area in the bounding box B. For example, the tracking unit 108 tracks an item by using an area in the bounding box B of one frame B as a template image and performing template matching on each subsequent frame F. The method of tracking an item itself may use a known method, and the tracking unit 108 may track, for example, a feature point extracted from an area in the bounding box B. To give another example, the bounding box B may be used as an area that is a base of a method called CSRT tracker.

Although a case in which the teaching data is generated by executing the processing that is illustrated in FIG. 3 for each frame in a moving image is described in the embodiment, the teaching data may be generated based on a result of tracking by the tracking unit 108. For example, the position information acquisition unit 105 may acquire, for the next frame F that is next to the frame F from which the bounding box B has been acquired by the method of FIG. 3, the position information of the bounding box B of the next frame, based on a result of tracking an item in the acquired bounding box B.

According to Modification Example (2), the administrator is freed from specification of the position of an item by tracking an item that is included in a moving image based on the position information. The administrator's burden can thus be lightened. In addition, an item can be tracked by processing that is simpler than in the case of inputting every frame to the learning model M1, and the processing load on the learning device 10 can accordingly be lightened.

(3) For example, the input unit 101, the first acquisition unit 102, the second acquisition unit 103, the third acquisition unit 104, and the position information acquisition unit 105 may be implemented in the vending machine 20. In this case, those functions are implemented mainly by the control unit 21. For example, the data storage unit 200 of the vending machine 20 stores the pieces of data that are stored in the data storage unit 100 in the description given above. The input unit 101 that is implemented in the vending machine 20 inputs to the learning model M1 the frame F that is generated by the photographing unit 26 after the user opens the door.

The first acquisition unit 102, the second acquisition unit 103, and the third acquisition unit 103 that are implemented in the vending machine 20 acquires the heat map H, the motion image I1, and the skin image I3, respectively, by the same method as the method described in the embodiment. The position information acquisition unit 105 that is implemented in the vending machine 20 uses the same method as the method described in the embodiment to acquire the position information of the bounding box B from the frame F generated by the photographing unit 26 (a frame in which an item being held by a user is photographed). The sales processing unit 201 of the vending machine 20 may identify the type and position of the item grasped by the user, based on the classification information of the item recognized by the learning model M1 and on the position information acquired by the position information acquisition unit 105. Processing that is executed based on the type and position of the item is as described in the embodiment.

This modification example may be combined with Modification Example (2). For example, the tracking unit 108 may be implemented in the vending machine 20. In this case, the tracking unit 108 is implemented mainly by the control unit 21. The tracking unit 108 that is implemented in the vending machine 20 tracks, based on the position information of the bounding box B acquired in one frame, an item in the bounding box B in the subsequent frames. The sales processing unit 201 may update the shopping cart data DT based on the position of the tracked bounding box B. In this case, each of the input unit 101, the first acquisition unit 102, the second acquisition unit 103, the third acquisition unit 104, and the position information acquisition unit 105 may periodically execute the processing of the own unit, to thereby enable the position information acquisition unit 105 to acquire the position information based on the latest frame F.

According to Modification Example (3) of the present disclosure, an item grasped by the user can be tracked by acquiring the type and position of the item with the use of the learning model M1, without preparing the learned learning model M2.

(4) For example, the modification examples described above may be combined.

Although a scene in which a commercial product sold by the vending machine 20 is recognized is given as an example in the embodiment, an object to be recognized may be an object other than commercial products. For example, in the case of applying the object recognition system S to a scene in which a human face is to be recognized, a human face may correspond to the object. To give another example, in the case of applying the object recognition system S to a scene in which a vehicle is to be recognized, a vehicle body or a license plate may correspond to the object. An object to be recognized can be any object suitable for the object recognition system S.

For example, although the main functions are implemented in the learning device 10 in the case described above, the functions may be distributed among a plurality of computers. For example, the functions may be distributed among the learning device 10, the vending machine 20, and the server 30. The server 30, for example, may acquire the bounding box B. When the object recognition system S includes a plurality of server computers, for example, the functions may be distributed among the plurality of server computers. The data stored in the data storage unit 100, the data storage unit 200, and the data storage unit 300 in the description given above, for example, may be stored in another computer.

The invention claimed is:

1. An object recognition system, comprising at least one processor configured to:
    input an input image to a learning model for recognizing a first object;
    acquire a heat map about a position that is a basis for recognition of the first object by the learning model having the input image input thereto based on a Class Activation Map method;
    acquire a motion image about a position of a moving body that is included in the input image based on motion detection processing;
    acquire another image by retaining a part of the input image in which a sum of a pixel value in the heat map and a pixel value in the motion image is equal to or more than a threshold value; and
    acquire position information about a position of the first object included in the input image, based on the heat map and the motion image.

2. The object recognition system according to claim 1,
    wherein the first information is information by which a value indicating a strength as a basis for recognition by the learning model is identifiable for each pixel of the input image, and
    wherein the second information is information by which a value indicating a strength as the moving body or the foreground is identifiable for each pixel of the input image.

3. The object recognition system according to claim 2, wherein the at least one processor is configured to acquire the position information based on a result of adding together, with a use of a predetermined mathematical expression, a value identified from the first information as a value that is associated with a pixel or pixels in the input image and a value identified from the second information as a value that is associated with a pixel or pixels in the input image.

4. The object recognition system according to claim 1,
    wherein the at least one processor is configured to acquire third information about a position of a second object, which is included in the input image and which grasps the first object, and
    wherein the at least one processor is configured to acquire the position information based further on the third information.

5. The object recognition system according to claim 4,
    wherein the first information is information by which a value indicating a strength as a basis for recognition by the learning model is identifiable for each pixel of the input image,
    wherein the second information is information by which a value indicating a strength as the moving body or the foreground is identifiable for each pixel of the input image, and
    wherein the third information is information by which a value indicating a strength as the position of the second object is identifiable for each pixel of the input image.

6. The object recognition system according to claim 5, wherein the at least one processor is configured to acquire the position information based on a result of adding together, with a use of a predetermined mathematical expression, a value identified from the first information as a value that is associated with a pixel or pixels in the input image and a value identified from the second information as a value that is associated with a pixel or pixels in the input image, and subtracting, with a use of a predetermined mathematical expression, a value identified from the third information as a value that is associated with a pixel or pixels in the input image.

7. The object recognition system according to claim 1, wherein the at least one processer is configured to acquire the position information based further on weighting that is heavier in the heat map than the motion image.

8. The object recognition system according to claim 1,
    wherein the position information indicates an area including the first object, and
    wherein the at least one processer is configured to acquire a plurality of candidates for the area, and acquire the position information based on one of the plurality of candidates that is largest in size.

9. The object recognition system according to claim 1,
    wherein the input image includes a plurality of types of objects each of which is the first object, and
    wherein the at least one processer is configured to acquire the position information for each object type out of the plurality of types of objects included in the input image.

10. The object recognition system according to claim 1, wherein the at least one processer is configured to execute, based on teaching data that is generated based on the input image and the position information, learning processing of another learning model for recognizing a position of the first object.

11. The object recognition system according to claim 10,
    wherein the input image is a frame in a moving image,
    wherein the at least one processer is configured to acquire the position information for each frame in the moving image, and
    wherein the at least one processer is configured to execute the learning processing based on a teaching data set including a plurality of pieces of the teaching data that are generated from the moving image.

12. The object recognition system according to claim 1,
    wherein the input image is a frame in a moving image, and
    wherein the at least one processer is configured to track the first object included in the moving image, based on the position information.

13. The object recognition system according to claim 1, wherein the learning model is a classifier configured to classify a type of the first object, or a determiner configured to determine whether the first object is present.

14. The object recognition system according to claim 1, wherein the position information is information about a bounding box including the first object.

15. A position information acquisition method, comprising:
    inputting an input image to a learning model for recognizing a first object;
    acquiring a heat map about a position that is a basis for recognition of the first object by the learning model having the input image input thereto based on a Class Activation Map method;
    acquiring a motion image about a position of a moving body, that is included in the input image based on motion detection processing;
    acquire another image by retaining a part of the input image in which a sum of a pixel value in the heat map and a pixel value in the motion image is equal to or more than a threshold value; and
    acquiring position information about a position of the first object included in the input image, based on the heat map and the motion image.

16. A non-transitory computer-readable information storage medium for storing a program for causing a computer to:
- input an input image to a learning model for recognizing a first object;
- acquire a heat map about a position that is a basis for recognition of the first object by the learning model having the input image input thereto based on a Class Activation Map method;
- acquire a motion image about a position of a moving body, that is included in the input image based on motion detection processing;
- acquire another image by retaining a part of the input image in which a sum of a pixel value in the heat map and a pixel value in the motion image is equal to or more than a threshold value; and
- acquire position information about a position of the first object included in the input image, based on the heat map and the motion image.

17. The object recognition system according to claim 1, wherein the learning model performs skin detection processing to form a skin image and subtracts the skin image from the input image.

* * * * *